March 29, 1966  A. L. WATTS ETAL  3,243,228
TWO POSITION SEAT

Filed Dec. 14, 1964  3 Sheets-Sheet 1

Inventors.
ALAN LEONARD WATTS &
DERRICK GEOFFREY WILLIAMS
BY
Tweedale & Gerhardt
Attorneys.

March 29, 1966     A. L. WATTS ETAL     3,243,228
TWO POSITION SEAT
Filed Dec. 14, 1964     3 Sheets-Sheet 2
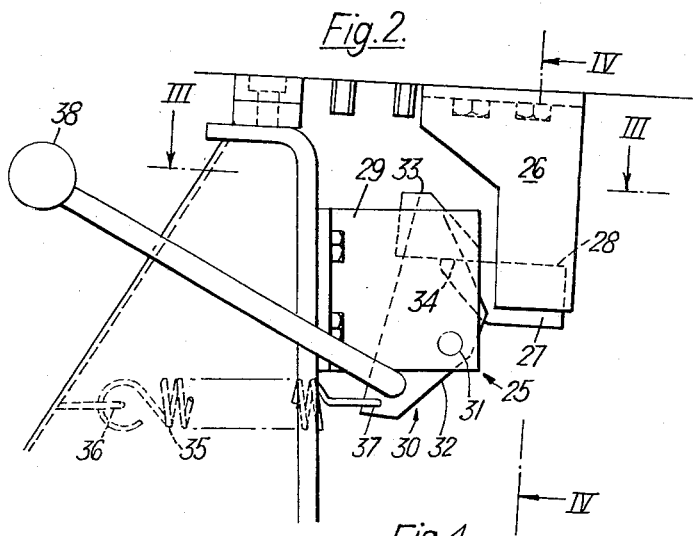
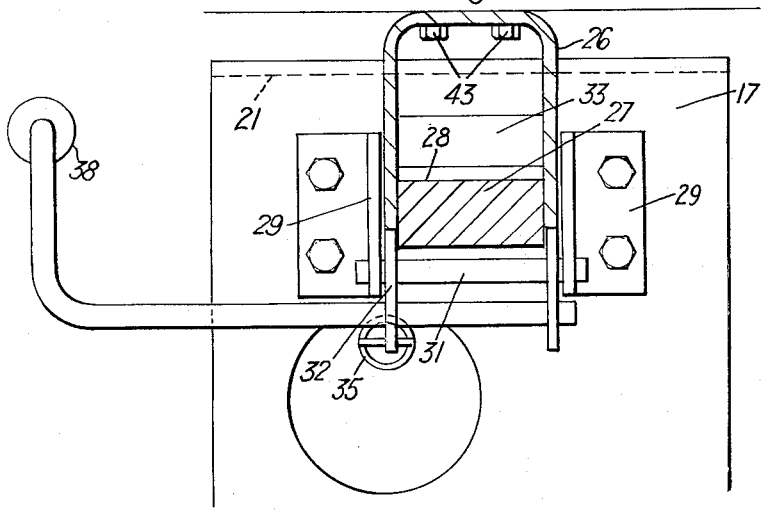
Inventors.
ALAN LEONARD WATTS &
DERRICK GEOFFREY WILLIAMS
BY Tweedale & Gerhardt
Attorneys.

United States Patent Office 3,243,228
Patented Mar. 29, 1966

3,243,228
TWO POSITION SEAT
Alan Leonard Watts and Derrick Geoffrey Williams, both of Coventry, England, assignors to Massey-Ferguson Services N.V., Curacao, Netherlands Antilles
Filed Dec. 14, 1964, Ser. No. 417,877
Claims priority, application Great Britain, Dec. 21, 1963, 50,577/63
8 Claims. (Cl. 297—92)

This invention relates generally to vehicle seats and more particularly to a two position seat for tractors and similar vehicles whereby the operator can adjust the seat to face in opposite directions for alternately driving the vehicle and operating the controls of equipment carried by the vehicle, such as backhoes and similar earth-working equipment as well as fork lifts and the like.

The invention will be described with particular reference to construction equipment, such as tractor mounted backhoes, in which the operator faces forwardly when driving the tractor, and faces rearwardly when operating the controls for the backhoe. Since the backhoe controls are normally located at a higher level than the tractor controls, the operator must be supported at a higher level when facing rearwardly to operate the backhoe than when facing forwardly to drive the tractor. Consequently, it is desirable for the seat for such vehicles to be mounted on the vehicle in such a manner that it can be reversed, or adjusted to face in opposite directions, while at the same time, the seat is elevated from its normal driving position in the rearwardly facing direction.

It is therefore an object of this invention to provide a two position seat for a tractor or similar vehicle which can be pivoted about a transverse axis to reverse the positions of the back and seat portions of the seat.

Another object is to provide a seat for a vehicle which is pivotal about a horizontal transverse axis from a relatively low position to an opposite facing, elevated position, the seat in the lower position having its seat portion positioned below the pivotal axis of the assembly.

The invention is embodied in an assembly including a support member having a forwardly extending lower base portion supported on the frame of a tractor or similar vehicle, and means defining with the support member an upper base portion rearwardly of and spaced above the lower base portion. Pivotally mounted on the support is a unitary seat frame having a pair of body supporting portions extending at an angle from each other. The seat frame is pivotally connected with the support member in such a manner that the seat can be pivoted about a transverse axis from a position in which one of the body supporting portions rests on the lower base portion with the other portion projecting upwardly to define the back portion of the seat to a position in which the portion formally defining the back becomes the seat portion resting against the upper base portion and facing in the opposite direction.

Other objects, advantages and features of the invention will become apparent from the following description taken in connection with the accompanying drawings in which:

FIG. 2 is an enlarged detail view of the assembly of FIG. 1; and

Figure 3:
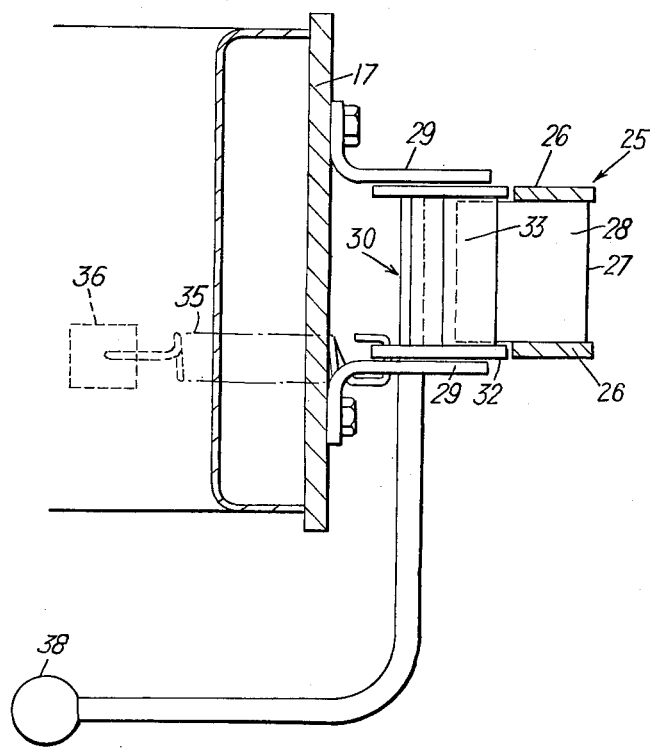

FIGS. 3 and 4 are sectional views taken respectively on lines 3—3 and 4—4 of FIG. 2.

While the invention will be described in connection with a specific embodiment, it should be understood that the invention is not limited to the exact construction shown. On the contrary, all alternatives, modifications and equivalents falling within the scope and spirit of the invention are intended to be covered herein.

Figure 1:
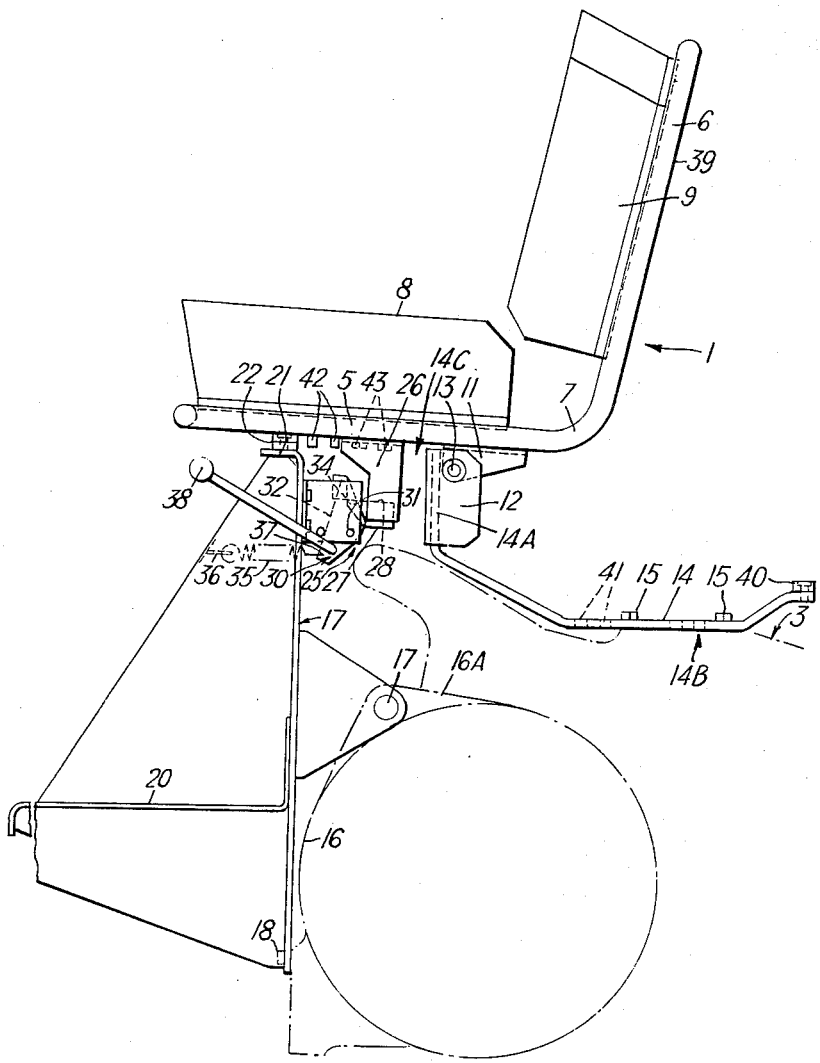
FIG. 1 is a side elevation of a seat mounted on the rear of a tractor and embodying the invention in a preferred form.

With reference to FIG. 1, a seat 1 is supported on the rear frame 3 of a tractor having a rear axle housing 16. Seat 1 includes a unitary tubular frame having a first body supporting portion 5 and a second body supporting portion 6 joined together by a curved portion 7 and extending at an angle with respect to each other. Cushions 8 and 9 are supported on portions 5 and 6, respectively.

Secured to the underside of member 5 in the position shown in FIG. 1 is a pair of laterally spaced brackets 11 which are pivotally connected to a pair of brackets 12 by a pin 13. Brackets 12 are mounted on an upstanding portion 14A of a support member 14 secured by bolts 15 to the top of the hydraulic lift housing of tractor 3.

Support member 14 includes a lower base portion 14B which extends forwardly from the upstanding portion 14A. The upper edge of portion 14A cooperates with the flange 21 of a support bracket 17 to define an upper base portion 14C. Bracket 17 is secured at its lower end to the rear axle casing 16 of the tractor by bolts 18 and is secured intermediate its ends to the axle casing by pin 19 received in lugs 16A formed on the axle casing. Bracket 17 is formed with a rearwardly projecting platform or footrest 20 for the operator when the seat is in the rearwardly facing position shown in FIG. 1. The underside of seat portion 5 rests against a stop 22 mounted on flange 21.

Seat frame 1 is locked in the elevated, rearwardly facing position of FIG. 1 by a latch 25. The latch 25 includes a pair of laterally spaced brackets 26 which project downwardly from the underside of seat portion 5 and carry an abutment member 27 which extends between brackets 26 and is formed with a flat upper surface 28. A catch 30 is pivotally mounted on a pin 31 between a pair of brackets 29 secured to the support bracket 17. Catch 30 includes laterally spaced side members 32 and a transverse abutment member 33 extending between the side members 32. Abutment member 33 has a flat lower face 34 which cooperates with the upper face 28 of abutment member 27 to secure the seat frame in the position of FIG. 1.

Catch 30 is biased toward a locking position shown in the drawing by a tension spring 35 connected between hook 36 on bracket 17 and apertures 37 in the ends of side members 32 on the opposite side of pivot pin 31 from abutment member 33. Tension spring 35 biases the catch 30 into the locking position in which surfaces 34 and 28 are in abutting engagement with each other to lock the seat against pivotal movement about pin 13.

Latching member 25 can be released by a hand lever 38 secured to one of the laterally spaced side members 32 adjacent the point of connection of the associated tensioned spring 35 so that the catch may be pivoted to release the latch. When the latch is released, seat frame 1 may be pivoted in a clockwise direction as shown in FIG. 1 about pin 13. In the illustrated position, the seat frame 1 faces rearwardly to permit the operator to operate the controls of a backhoe or similar equipment mounted on the rear of the tractor. By pivoting the seat frame clockwise about the axis of pin 13, the seat frame portion 6 comes to rest on the lower base portion 14B of the support and cushion 9 becomes the seat cushion and cushion 8 becomes the back cushion with the seat facing forwardly permitting the operator to drive the tractor.

Seat frame 1 can be moved from the position shown to its forward facing, lower position by moving lever 38 downwards against the biasing force of spring 35 to move the surfaces 34 and 28 out of engagement with each other. The seat can then be rotated clockwise in a single movement about the axis of pin 13 to its forward facing, lower position in which the back 6 forms and the base 5 forms the back. The clockwise rotation is limited by frame portion 6 coming to rest against a stop 40 mounted on support member 14.

Since, in the forward facing position of a seat, pivot pin 13 is on the back of the seat and spaced above the plane of the portion 6 of the seat frame, the weight of the operator holds the seat in this position and there is no need to provide locking means for the seat in the forward position.

The seat can be adjusted along the longitudinal axis of the tractor by means of a series of bolt holes 41 in bracket 14 permitting selective engagement by bolts 15. Displacement of the seat forwardly from a position shown in the drawing moves abutment member 27 out of contact with catch 30. Consequently, a series of alternately selectable bolts 42 projecting from the underside of base portion 5 are provided for attachment of the brackets 26 by nuts 43 in a correspondingly displaced position.

It will be apparent to those skilled in the art that the invention is not limited to the exact construction shown, and that other forms may be adapted all coming within the scope and spirit of the invention.

What is claimed is:

1. A seat assembly for a vehicle comprising; a pair of upwardly projecting members mounted on the vehicle in fore and aft spaced relationship to define an upper seat support; a lower seat support member extending forwardly from the forward of said pair of upwardly projecting members; a unitary seat frame including a pair of body supporting portions extending at an angle from each other to define a seat having seat and the back portions when either one of said body supporting portions is disposed in a substantially horizontal position with the other of said body supporting portions projecting upwardly therefrom such that said one and said other body supporting portions define the seat and back portions, respectively, of the seat; and means connecting said seat frame to said forward upwardly projecting member for pivotal movement between a first position in which one of said body supporting portions rests on said lower horizontal base portion to define the seat portion with the other of said body supporting portions projecting upwardly to define the back portion, and a second position in which said other body supporting portion rests against said upper horizontal base portion to define the seat portion and said one body supporting portion projects upwardly therefrom to define the back portion; the pivotal axis of said seat frame being disposed transversely with respect to the common longitudinal axis of said upper and lower base portions and located above the plane of the seat portion when said seat frame is in said first position.

2. A seat assembly as defined in claim 1 further including a releasable latch member on said upper base portion engageable by the seat frame as it moves into said second position to latch the seat frame in said second position.

3. A seat assembly as defined in claim 2 wherein said latch member comprises a catch pivotally mounted on said support means for movement between locking and unlocking positions, means biasing the catch toward its locking position, and further including an abutment carried by said seat frame for engaging said catch when the frame moves to its second position, and a hand lever connected with said catch operable to move the catch against the biasing means to release the seat frame from engagement therewith.

4. In a vehicle having a transverse rear axle housing and a frame extending forwardly therefrom; support means including a support member having a forwardly extending, lower base portion secured to the vehicle frame and an upstanding portion projecting from the rear of said lower base portion and a bracket mounted on said axle housing and projecting upwardly therefrom, said bracket being spaced rearwardly of the upstanding portion of said support member and having an upper flange cooperating with the upper edge of said upstanding portion to define an upper, horizontal base portion; a unitary seat frame having first and second body supporting portions extending at an angle from each other; and means pivotally connecting said first body supporting portion to the upstanding portion of said support means near the upper end thereof permitting movement of said seat frame about a transverse axis between a first position in which said first body supporting portion rests against said upper base portion in a substantially horizontal position with the second body supporting portion projecting upwardly therefrom to define a rearwardly facing seat, and a second position in which said second body supporting portion rests against said lower base portion in a substantially horizontal position with the first body supporting portion projecting upwardly therefrom to define a forwardly facing seat.

5. The construction defined in claim 4 further including interengageable latch members on said seat frame and said support means operable to latch said seat frame in said first position.

6. The construction defined in claim 5 wherein said interengageable latch members include a catch pivotally mounted on said bracket and an abutment on said first body supporting member which projects beneath said first body supporting member when the seat frame is in said first position, and means biasing said catch to engage said abutment member.

7. The construction defined in claim 6 further including a release lever connected with said bracket operable to disconnect said catch from said abutment member permitting said seat frame to move from said first to second position.

8. The construction defined in claim 7 further including a rearwardly projecting footrest on said bracket spaced vertically beneath said upper base portion.

References Cited by the Examiner

UNITED STATES PATENTS

| | | | |
|---|---|---|---|
| 2,269,968 | 1/1942 | Baker | 248—376 X |
| 2,604,927 | 7/1952 | Bonnesen | 248—371 X |
| 2,814,335 | 11/1957 | Michelsen | 248—371 X |
| 2,833,367 | 5/1958 | Pool et al. | 182—2 X |
| 2,954,071 | 9/1960 | Morrison et al. | 297—346 X |
| 3,006,593 | 8/1961 | Plate et al. | 248—376 |
| 3,012,817 | 12/1961 | Hendrickson et al. | 297—93 |

FOREIGN PATENTS

| | | |
|---|---|---|
| 720,659 | 12/1954 | Great Britain. |
| 893,042 | 4/1962 | Great Britain. |

FRANK B. SHERRY, *Primary Examiner.*

J. T. McCALL, *Assistant Examiner.*